United States Patent [19]

Yoshizawa et al.

[11] Patent Number: 4,698,574

[45] Date of Patent: Oct. 6, 1987

[54] PROCESS CONTROL APPARATUS

[75] Inventors: Yasuo Yoshizawa, Yonezawa; Masatoshi Jinno, Shiroishi, both of Japan

[73] Assignee: Yoshiki Industrial Co., Ltd., Yonezawa, Japan

[21] Appl. No.: 800,118

[22] PCT Filed: Mar. 14, 1985

[86] PCT No.: PCT/JP85/00126

§ 371 Date: Oct. 23, 1985

§ 102(e) Date: Oct. 23, 1985

[87] PCT Pub. No.: WO85/04267

PCT Pub. Date: Sep. 26, 1985

[30] Foreign Application Priority Data

Mar. 14, 1984 [JP] Japan .................................. 59-47231

[51] Int. Cl.$^4$ ............................................. G05B 11/36
[52] U.S. Cl. ..................................... 318/609; 364/161; 236/10; 110/190
[58] Field of Search ............... 318/609, 610, 611, 561; 364/161; 236/11, 12.12, 14, 15, 15 BB, 15 BC, 15 BD, 23, 78 C, DIG. 8, DIG. 9; 237/2 R, 2 A, 8 A; 110/188, 185, 190, 186

[56] References Cited

U.S. PATENT DOCUMENTS

| 3,798,426 | 3/1974 | Bristol | 364/161 X |
| 3,824,479 | 7/1974 | Alger | 364/161 X |
| 3,938,017 | 2/1976 | Hayes | 318/610 |
| 4,205,381 | 5/1980 | Games | 364/161 X |
| 4,410,132 | 10/1983 | Levine | 236/11 |
| 4,415,966 | 11/1983 | Herzog | 318/610 |
| 4,430,698 | 2/1984 | Harris | 364/161 X |
| 4,520,301 | 5/1985 | Suzuki | 318/609 |

FOREIGN PATENT DOCUMENTS

| 2751584 | 5/1979 | Fed. Rep. of Germany | 318/609 |
| 0092010 | 6/1983 | Japan | 318/609 |
| 0101307 | 6/1983 | Japan | 318/609 |
| 0009704 | 1/1984 | Japan | 364/161 |

Primary Examiner—William M. Shoop, Jr.
Assistant Examiner—Patrick C. Keane
Attorney, Agent, or Firm—Oblon, Fisher, Spivak, McClelland & Maier

[57] ABSTRACT

When an output from a sensor (11) is decreased below a key-lock release preset value (K), a comparator (19) generates an output so as to reset a flip-flop (21) and to enable an AND gate (22). When the output from the sensor (11) is decreased below a reset preset value (R), a comparator (20) generates an output so as to supply a reset signal to an integrated value holding unit (16) through the AND gate (22) and to reset the flip-flop (21), thus thereafter restarting an integral action by the integrated value holding unit (16).

3 Claims, 5 Drawing Figures

PROCESS CONTROL APPARATUS

TECHNICAL FIELD

The present invention relates to a process control apparatus which executes, e.g., temperature control of a heating furnace.

BACKGROUND ART

In a heating furnace, for example, when heating is started in order to set the temperature of the furnace at a present central temperature, the furnace temperature is gradually increased up to the preset central heating temperature from an ambient temperature. In this case, the furnace temperature is continuously monitored by a temperature measuring element. When the furnace temperature reaches the preset central temperature, heating is stopped, and thereafter, heat supply to the furnace is controlled so as to maintain the furnace at this temperature.

The heating temperature increase step will be considered in more detail. Heating is continued until a furnace temperature reaches the preset central temperature, and when the furnace temperature has reached the preset central temperature, heating is stopped. However, when the furnace temperature is to be increased quickly, even if heating is stopped when the furnace temperature has reached the preset central temperature, the actual furnace temperature exceeds the preset central temperature, and temperature control is performed in a state wherein the furnace temperature greatly varies with respect to the preset central temperature.

When temperature control of the furnace is performed by PI control, the temperature is increased from a low temperature to a preset central temperature when control is started, and an integral action in an integrator is taken so as to correspond to an error with respect to the central temperature which is indicated by a temperature increase curve. In a state wherein the temperature exceeds the preset central temperature, the data stored in the integrator during the temperature increase up to the central temperature is reduced. Thus the temperature is controlled so that the temperature is set to be the preset central temperature.

However, when such control is executed, the integrated value becomes very large while the temperature is increased from the low temperature to the preset central temperature. For this reason, even if the integrated value, when the temperature exceeds the central temperature, is reduced from this integrated value, the integrated value cannot be effectively decreased, resulting in an overshoot state in which the temperature greatly exceeds the central temperature. Thus, convergence control characteristics with respect to the central temperature are degraded, and the temperature control characteristics become poor.

In order to overcome such drawbacks, it is proposed to set a PI constant while the temperature is increased to the central temperature and another PI constant after the temperature exceeds the central temperature, and to selectively use one of these PI constants in accordance with a temperature. However, with such a means, the two PI constants must be set, and an integral control element (I) must be set high. Therefore, it is difficult to control the temperature quickly.

Alternatively, a method is proposed wherein a plurality of points are set until a central temperature value is reached, and the rate of increase is decreased at each preset point so as to polygonally control the temperature. With this method, overshooting can be effectively prevented. However, it takes a long period of time to increase the temperature from a low to a preset central temperature, and any disturbance cannot be overcome.

The same problem occurs when the temperature greatly changes near the central temperature, also resulting in an overshoot state.

DISCLOSURE OF THE INVENTION

The present invention has been made in consideration of the above situation, and has as its object to provide a process control apparatus for, e.g., heating control, wherein an actual temperature can be quickly and smoothly convergence-controlled with respect to a preset central temperature without causing overshooting when the temperature is increased up to the preset central temperature.

In a process control apparatus according to the present invention, PI control is executed as follows. A first value to be a key lock release line is set, and a second value to be a reset line is set as an integral restart line. A reset enable state is set when a temperature, for example has exceeded the first preset value and is approaching a preset central value. When the temperature has exceeded the second preset value and is approaching the central value, an integrator is reset, so that an integral action of the integrator is taken again when the temperature exceeds the second preset value.

According to the present invention, during PI control, even when a current value is considerably different from the present central value, convergence control action can be quickly and smoothly executed with respect to the preset central value by a very simple arrangement, thereby effectively eliminating occurrence of an overshoot control state.

BEST MODE OF CARRYING OUT THE INVENTION

Figure 1:
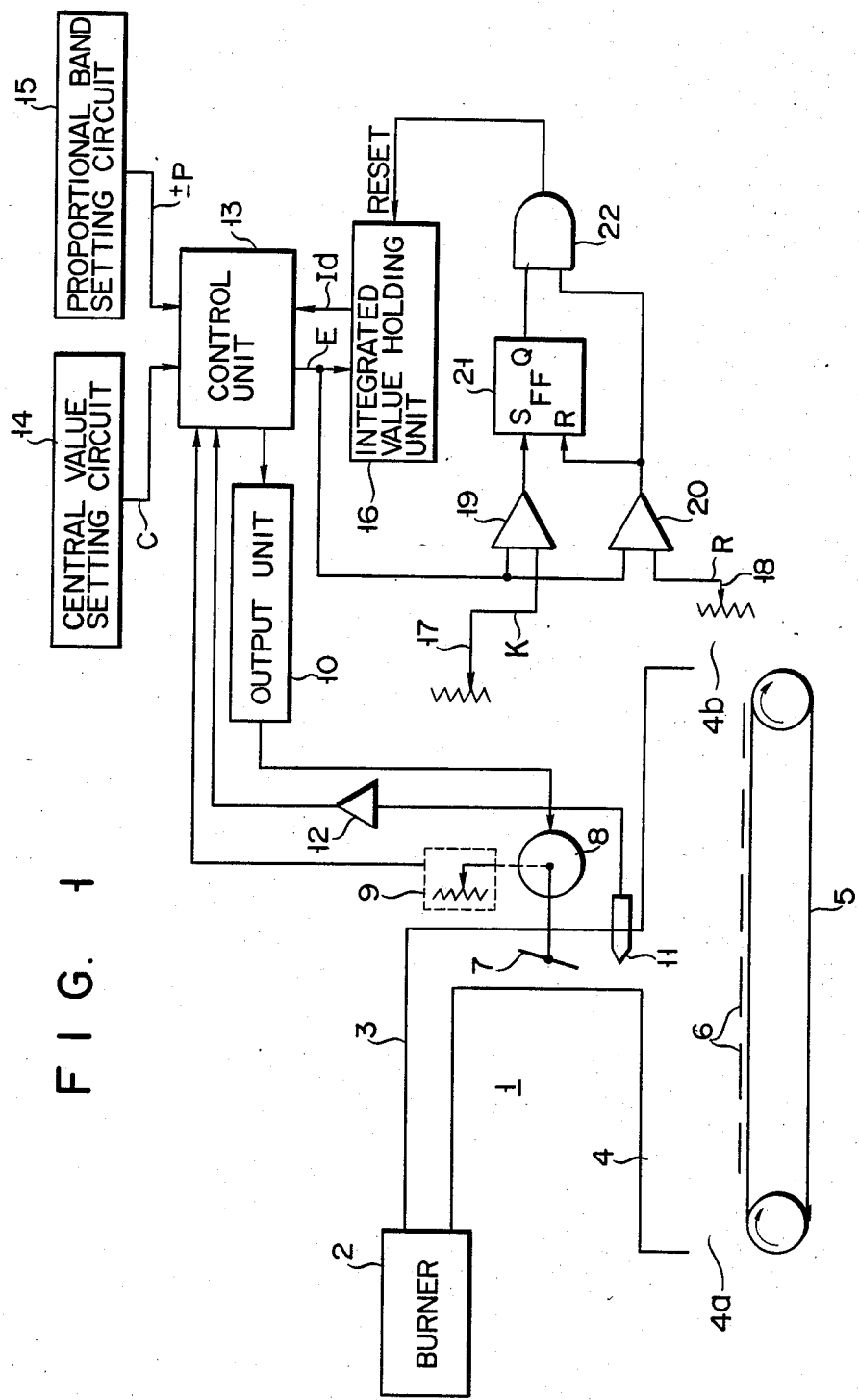
FIG. 1 is a block diagram for explaining a keyed PI control apparatus according to an embodiment of the present invention.

An embodiment of the present invention will be described with reference to the accompanying drawings. FIG. 1 shows an arrangement for the temperature control of a heating furnace 1. A temperature signal supplied from a temperature sensor 11 comprising a thermocouple or the like provided in the heating furnace 1 is supplied to a control unit 13 using a microprocessor through an amplifier 12. The heating furnace 1 is arranged so that air heated by a burner 2 is introduced to the furnace's main body 4 through a duct 3. A belt conveyor 5 is arranged in the furnace's main body 4, and a heating object 6 is conveyed from an entrance 4a to an exit 4b. The temperature sensor 11 is arranged in a boundary portion between the duct 3 and the furnace's main body 4. A volume of the heated air supplied from the burner 2 to the furnace's main body 4 is controlled by opening/closing a control valve 7 provided adjacent to the temperature sensor 11 on the upstream side thereof. The opening of the control valve 7 is adjusted by an actuator 8 driven in response to a control output supplied from the control unit 13 through an output unit 10, and a signal indicating the opening is supplied from a position sensor 9 to the control unit 13. The control unit 13 receives a signal corresponding to a preset central temperature C from a central value setting circuit 14 for setting a target temperature, i.e., the central temperature C, and +P and −P signals, generated from a proportional band setting circuit 15, for designating a preset proportional band +P with respect to central value C for PI control. The control unit 13 samples the temperature signal from the sensor 11 at specified intervals so as to obtain the error E between the detection value and the central value C. The error E is supplied to an integrated value holding unit 16 which sequentially integrates a value indicated by a curve representing a change in temperature so as to hold the integrated value. In this case, when the temperature signal from the sensor 11 is out of the preset proportional band ±P, integration of the temperature error E with respect to the central value C is not performed. Therefore, only the error E with respect to the central value C of the temperature signal within the preset proportional band ±P is supplied to the integrated value holding unit 16, thus being subjected to integral action.

In this apparatus, first and second setting circuits 17 and 18 are provided. The first setting circuit 17 sets key-lock release lines ±K sufficiently separated from the central value C within the proportional band ±P. The second setting circuit 18 sets reset lines ±R closer to the central value C than the values +K for setting limit values of the integral action.

Output signals K and R from the first and second setting circuits 17 and 18 are respectively supplied to comparators 19 and 20. A signal corresponding to the error E with respect to the error C from the control unit 13 is supplied to the comparators 19 and 20 as a comparison signal. When the preset value K or R is small with respect to the error E, no output signal is generated from the flip-flop 21, and when the error E of the detection temperature with respect to the central temperature C becomes smaller than K, an output signal is generated from the comparator 19. The output signal from the comparator 19 sets a flip-flop 21. When the error E becomes smaller than R, an output signal from the comparator 20 is obtained to reset the flip-flop 21. In this case, the comparator 19 preferably generates a pulse output signal when the error E crosses +K, where the error E becomes equal to or less than the present value K.

The flip-flop 21 generates an enable signal for resetting the integrated value holding unit 16. Thus, the reset enable signal from the flip-flop 21 in a set mode is supplied to an AND gate 22. The AND gate 22 also receives the output signal from the comparator 20, and the output signal therefrom is supplied to the integrated value holding unit 16 as an integrated value data resetting instruction. Thus, the integrated value data is reset and the holding operation of the integrated value in unit 16 is restarted.

The integrated value data Id held in the integrated value holding unit 16 whose integrated value holding operation is controlled in the above manner is supplied to the control unit 13, and the integrated value data is supplied to the output unit 10 from the control unit 13 and is then supplied to the actuator 8 as an opening control signal for the valve 7 in the duct 3 of the heating furnace 1, thus controlling the temperature of the heating furnace 1 to approach the preset central value C.

The operation state of the apparatus with the above arrangement will be explained with reference to FIGS. 2 and 3. As described above, the proportional band ±P is set to include the central value C therein from the central value setting circuit 14. The first preset values ±K to be the key-lock release lines are set within the proportional band ±P by the setting circuit 17, and the second preset values ±R to be the reset lines are set within the range defined by the first preset values ±K.

Figure 2:
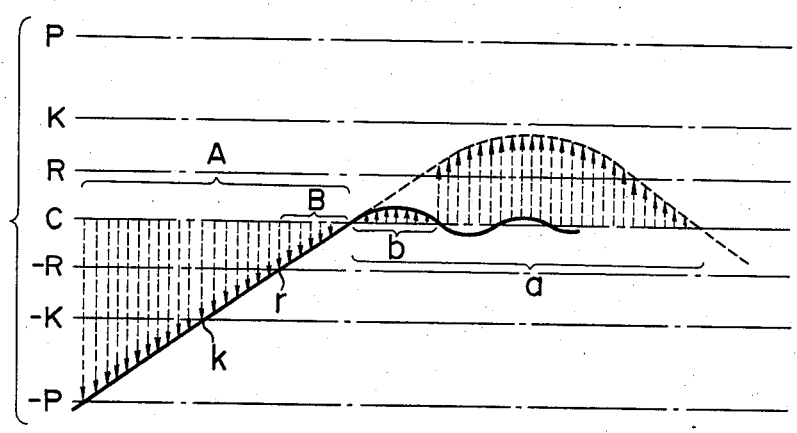
FIG. 2 is a graph for explaining the operation state of the embodiment.

A case will be explained wherein the first and second preset values +K, and +R of FIG. 2 are not set. When the heating is started from a heating furnace stop state, the temperature of the furnace is increased from a temperature error E lower than −P to the preset central temperature C, as shown in FIG. 2. When the temperature error E becomes at −P, the integral action of the error E is started, and the integrated values are held in the integrated value holding unit 16. In this case, the temperature is detected in response to a sampling signal at specified intervals, as indicated by broken arrows in FIG. 2. The length of the arrow corresponds to the error E to be integrated in a sampling mode.

The integral action is continued as the temperature in the furnace increases. When the temperature exceeds the preset central value C, a direction of the broken arrows is inverted in the sampling mode, so that the integrated value data held in the integrated value holding unit 16 is subjected to reduction. In other words, when the integral action is executed within the proportional band, the errors E integrated within the range of a time period A are now integrated in the opposite direction during a time period a. Therefore, since the integrated value data is reduced during the time period a, the temperature is controlled in an overshoot state.

Figure 3:
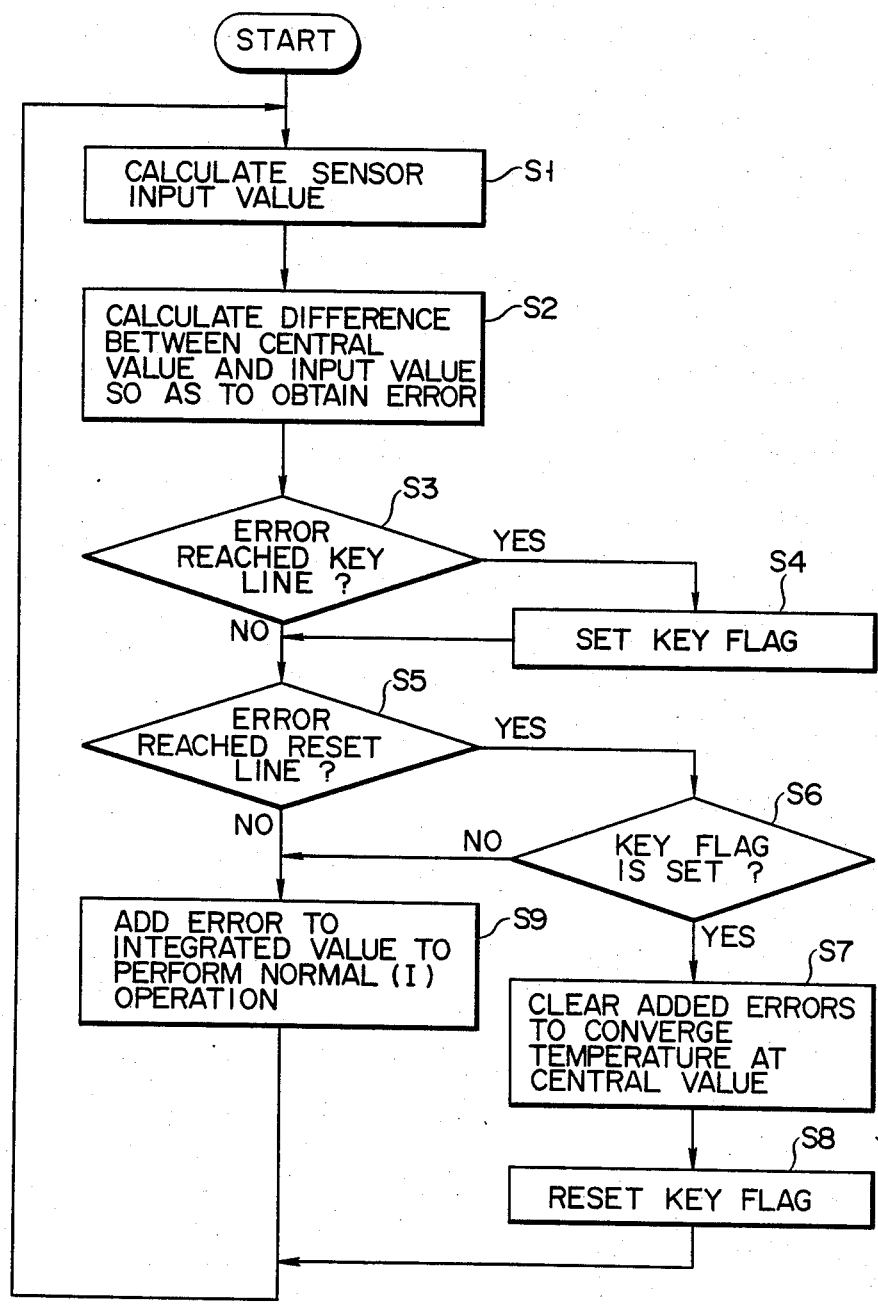
FIG. 3 is a flow chart for explaining a function of the embodiment.

In contrast to this, as described in the above embodiment, when the first and second preset values K and R are set, an input value of the sensor 11 is measured in step S1 of FIG. 3. The input value is supplied to the control unit 13, and in step S2, the difference between the input value and the central value C is obtained as the error E. When the measured temperature is increased and the error E reaches at −P, the integral action is started. If it is detected in step S3 that the temperature error E reaches at the first preset value K, the flip-flop 21 is set in response to the output signal from the comparator 19. In step S4, a key flag is set, thus setting the reset enable state. When the temperature is further increased and the error E reaches the second preset value R, this state is detected in step S5, and the output signal is generated from the comparator 20. It is determined in step S6 that the key flag is set. The integrated value holding reset instruction is supplied from the AND gate 22 to the integrated value holding unit 16, and the previous integrated value data are cancelled in step S7, thus restarting the integrated value holding operation. In this case, the flip-flop 21 is reset in response to the output signal from the comparator 20, and the key flag is also reset in step S8. After the reset signal is supplied to the holding unit 16, the flip-flop 21 is no longer set until the output signal is generated from the comparator 19, i.e., until the measured temperature error E crosses the first preset value K. In this state, the flow returns to step S1. However, since the error E is equal to or less than R, the temperature is converged to the central value C through steps S5 and S9.

A reset enable flag is set at a point K when the temperature error E reaches at the key-lock release line sufficiently separated from the central value C, and the current integral action is detected as an abnormal operation, i.e, an excessive integral action. The integrated values are cleared at a point r when the temperature error E reaches at the reset lines ±R, and the integral action is performed for the time period B from the point r. Therefore, according to the present invention, as indicated by a solid curve, the integrated values obtained during the period B are reduced during a time period b much shorter than the time period a. That is, PI control having only a small overshoot amount is executed.

Positions of the lines defined by the first and second preset values are set as optimum values for a control object, e.g., the heating furnace. For example, when ±50% of the proportional band P was experimentally set for the key-lock release lines and ±25% thereof was set for the reset lines, satisfactory PI control could be performed.

The apparatus is not only operated for temperature increase control up to the central value C when the operation is started. Even if the measured value is abruptly changed, when the measured value changes so as to exceed the first preset value, the integrated value holding reset operation is executed, and convergence control with respect to the central value is quickly performed.

Figure 4:
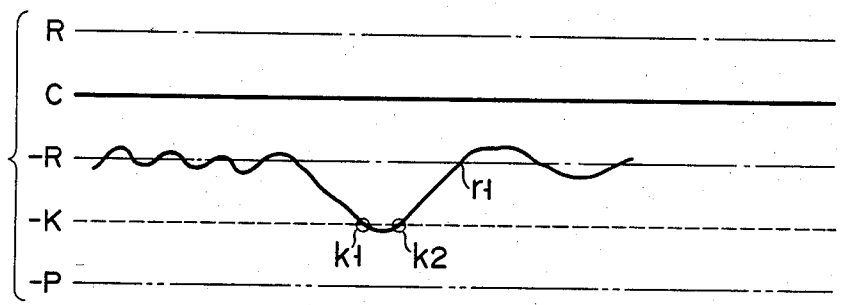
FIGS. 4 and 5 are respectively graphs for explaining the operation state of the embodiment.

Assume that temperature control is performed on the reset line −R lower than the central value C, as shown in FIG. 4. In this case, although the output is generated from the comparator 20, the flip-flop 21 is kept reset, and therefore, the integrated value holding unit 16 is not reset. As a result, since PID control is conducted while the integrated value holding unit 16 holds the integrated values, a malfunction such as divergence will not occur.

In this state, assume that the error E is increased to exceed the line K at k1, as shown in FIG. 4. If the error E is lowered below the key-lock release line −K at a point of k2 immediately after k1, the key flag is set again, and the flip-flop 21 is reset, thus resetting the integrated value holding unit 16.

Figure 5:
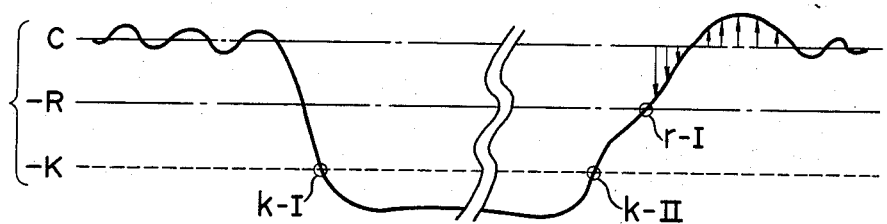

Assume that the furnace 1 shown in FIG. 1 is set on standby state when the furnace 1 is satisfactorily controlled to be maintained at the central value C. In this case, the temperature of the furnace 1 is gradually lowered below a crossing point k-I with the key-lock release line −K, as shown in FIG. 5. The temperature is maintained on standby temperature. If the operation of the furnace 1 is restarted after, e.g., 20 minutes from the point k-I, the temperature of the furnace 1 again exceeds the key-lock release line −K at a crossing point k-II, and the flip-flop 21 is set. Then, the temperature curve crosses the reset line −R at a reset point r-I, and the integrated value holding unit 16 is reset. In this manner, according to the present invention, if process control is restarted after a standby period of 20 minutes, initial setting need not be performed again, because the integration is not performed between points k-I and k-II.

When the embodiment of FIG. 1 was applied to dry a metal plate subjected to color off-set printing on its surface as the heating object 6, a very good result was obtained. When a color-printed metal plate used for manufacturing aluminum cans for soft drinks is dried, it is known that printed color tones highly depend on temperature. Conventionally, color tones are degraded by heating due to excessive, integral action. However, in this embodiment, since excessive integral action can be completely avoided, the temperature of the furnace 1 can be stabilized, thus completely preventing a change in color tones.

We claim:

1. A process control apparatus comprising:
    means for setting a central value to which a controlled variable is to be approached;
    means for setting a proportional band in which said central value is centered;
    means for setting a first pair of preset values each being equally separated from said central value within said proportional band;
    means for setting a second pair of preset values each being closer to the central value than the first pair of preset values and equally separated from said central value within said first pair of preset values;
    means for obtaining error data representing a difference value between said central value and the controlled variable;
    means for integrating said error data;
    means for commencing the integrating means when the controlled variable reaches within said proportional band;
    means for setting said integrating means in a reset enable state when said error data reaches at one of the first pair of present values from outside of a range defined by the first pair of preset values;
    means for resetting said integrating means when said error data reaches at one of the second pair of preset values when the reset enable state is set; and
    means for starting an integral action of said integrating means when an integrated value is reset by said resetting means.

2. A process control apparatus according to claim 1, wherein said reset enable state setting means includes a first comparator for generating an output when the error data reaches at said one of the first pair of preset values, a flip-flop for generating a set output upon reception of the output from said first comparator, and an AND gate enabled in response to said set output from said flip-flop.

3. A process control apparatus according to claim 2, wherein said resetting means includes a second comparator for generating an output when the error data reaches at said one of the second pair of preset values, means for supplying the output from said second comparator to a reset terminal of said flip-flop and to an input terminal of said AND gate, and an integrated value holding circuit reset by the output from said AND gate.

* * * * *